United States Patent [19]
Norris

[11] Patent Number: 5,781,150
[45] Date of Patent: Jul. 14, 1998

[54] GPS RELATIVE POSITION DETECTION SYSTEM

[75] Inventor: Elwood G. Norris, Poway, Calif.

[73] Assignee: American Technology Corporation, Poway, Calif.

[21] Appl. No.: 542,799

[22] Filed: Oct. 13, 1995

Related U.S. Application Data

[63] Continuation-in-part of Ser. No. 377,973, Jan. 25, 1995, Pat. No. 5,689,269.

[51] Int. Cl.$^6$ .............................. H04B 7/185; G01S 5/02
[52] U.S. Cl. ................................ 342/357; 342/419
[58] Field of Search .................. 342/357, 419; 455/12.1

[56] References Cited

U.S. PATENT DOCUMENTS

| | | | |
|---|---|---|---|
| 3,063,048 | 11/1962 | Lehan et al. | |
| 4,021,807 | 5/1977 | Culpepper et al. | |
| 4,593,273 | 6/1986 | Narcisse . | |
| 4,675,656 | 6/1987 | Narcisse . | |
| 5,021,794 | 6/1991 | Lawrence . | |
| 5,119,504 | 6/1992 | Durboraw, III . | |
| 5,146,231 | 9/1992 | Ghaem et al. | 342/419 |
| 5,172,110 | 12/1992 | Tiefengraber . | |
| 5,245,314 | 9/1993 | Kah, Jr. . | |
| 5,289,195 | 2/1994 | Inoue . | |
| 5,307,277 | 4/1994 | Hirano . | |
| 5,434,789 | 7/1995 | Fraker et al. | 364/460 |
| 5,506,587 | 4/1996 | Lans | 342/357 |
| 5,539,398 | 7/1996 | Hall et al. | 340/907 |

OTHER PUBLICATIONS

GPS Technology and Opportunities by Clyde Haris and Roy Sikorski.
Utah Meeting Shows Amazing World of Navigation Satellites By Lee Siegel.
A Marriage Made In Orbit: GPS and PCS by Francis X. Kane.
A Sampling Of Global Positioning System Receivers by Don Herskovitz.
How Mobile Computers Can Help You Find Yourself by Gerald Houston.
This 'Remote' Shows Its Users Exactly Where Here Is by Liz Mullen.
CAR 54, Where Are You? By Michael Puttre.
United States Securities And Exchange Commission Form 10-K FRO Trimble Navigational Limited.

Primary Examiner—Theodore M. Blum
Attorney, Agent, or Firm—Thorpe, North & Western, LLP

[57] ABSTRACT

A system of GPS devices which receive civilian GPS signals and provide an intuitive graphical interface for displaying the relative position of GPS devices in relation to each other, the relative position being accurate to several meters and defined as the distance to, direction of and height variance between GPS devices. A first GPS device with the person or object to be located transmits its GPS determined location to a second GPS device. This second GPS device includes a means for receiving the GPS determined position of the first GPS device, and also includes means for calculating the relative position of the first GPS device relative to the second GPS device based on a comparison of the received telemetry of the first GPS device and its own GPS determined position. The relative position of the first device is then graphically displayed on an interface of the second GPS device in a manner which eliminates the need for a map in order to travel to the location of the first GPS device. While providing an interface which displays a relative position of the first GPS device, this information remains accurate no matter how the orientation of the second GPS device changes with respect to a compass.

13 Claims, 8 Drawing Sheets

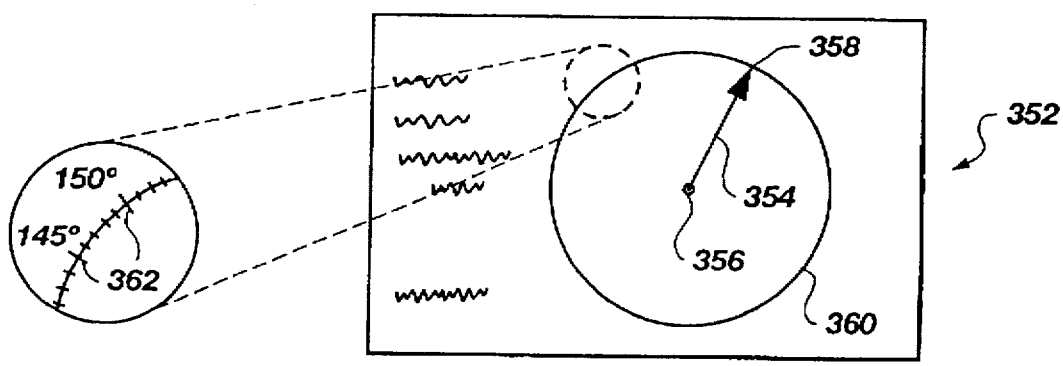
*Fig. 5B*
*Fig. 5A*
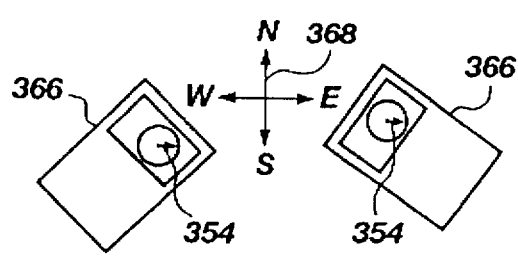
*Fig. 5C*
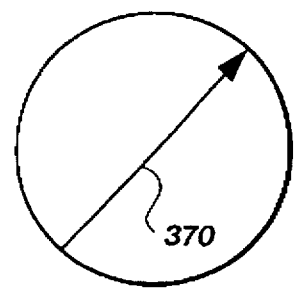
*Fig. 5D*
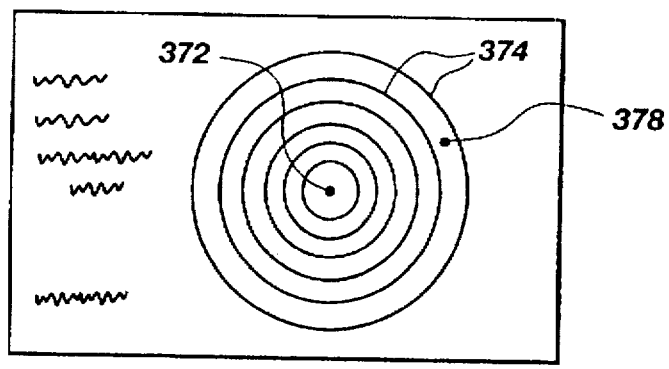
*Fig. 6*

5,781,150

GPS RELATIVE POSITION DETECTION SYSTEM

RELATED INVENTION

This patent application is a continuation-in-part of U.S. patent application Ser. No. 08/377,973, filed Jan. 25, 1995, now U.S. Pat. No. 5,689,269.

BACKGROUND OF THE INVENTION

1. Field of the Invention

This invention pertains to position determining devices, and in particular to devices that enable the position of an object or person to be determined relative to another person seeking said object, wherein a global positioning system receiver is used to determine the distance, direction and possible elevation difference between another global positioning system receiver.

2. Prior Art

Being able to determine the precise whereabouts of someone or something on or above the surface of the earth has long held promise for many purposes. Missing person searches would be much simpler if people who were lost had a transmitting device with them which constantly broadcast their precise position. Such a transmitter would be better than just a voice transmitter because the age of the people or their medical condition might prevent people from responding, or from responding in a helpful manner. However, numerous difficulties arise when actually searching for a transmitter which severely undermines the usefulness of such systems.

For example, U.S. Pat. No. 4,021,807 teaches how a transmitter hidden among stolen money could be used to locate those responsible for the theft and the money. A UHF homing device hidden among the money is capable of transmitting a signal which can be tracked by UHF tracking devices. Such a tracking device indicates whether the UHF homing signal is being transmitted from the front or rear, and from the left or right of a current position and orientation of the tracking device. Signal strength can also be used to give a crude estimation of distance between the tracking and homing devices if the signal is not too distorted by intervening structures.

The UHF homing signal and tracking devices comprise the same principle taught in U.S. Pat. No. 5,021,794. This patent teaches how a miniaturized transceiver carried by a child can be remotely activated by a parent to enable the child to be located by police cars with UHF trackers.

One of the drawbacks of such locator systems is that the position of the person or object is never known with any great degree of accuracy. A related issue is that the reliability of the signal received is also suspect, and can not be confirmed. Furthermore, a vehicle with a tracking device might circle a homing beacon many times before finding it due to the crude distance and direction indications of the technology.

Fortunately, a boon to precise location determining occurred when the United States saw fit to invest over $12 Billion in creating a network of 24 satellites in low earth orbit, each broadcasting precise timing signals from two on-board atomic clocks. Using precise and well-developed triangulation and quadrangulation formulas, a receiver that picks up signals from several satellites simultaneously can determine its position in global coordinates, namely latitude and longitude.

With this network orbiting overhead, a person anywhere on the earth has a 24 hour a day line-of-sight view to a sufficient number of satellites such that a person with a GPS receiver is able to determine their own longitude and latitude to within several meters, as well as their elevation. However, knowing your own position in longitude and latitude does not help others find you without extremely precise topographical or geophysical maps which also show longitude and latitude. Furthermore, the degree of precision in position determination is then only accurate to the resolution of the maps on hand. Nevertheless, the elements for a novel search and rescue system, as well as a general purpose locator, are made possible by the present invention utilizing GPS technology. Before the invention can be explained, however, a potential problem with GPS signals must first be explained.

In navigation, a method of guiding ships commonly used is dead-reckoning, whereby the known velocity and direction of travel of a ship from a known position such as a port is used to calculate the present position. The drawback is that the further a ship moves away from the known position, the less accurate the dead-reckoning position becomes. Inclement weather can further erode the accuracy of a ship's navigation, and endanger lives and property when traveling in close proximity to land. However, using a GPS receiver and a very accurate map with a sufficient degree of resolution, the movements of even a large vessel can be guided with a satisfactory degree of precision. The problem with GPS signals, surprisingly, arises from the high degree of precision that the system is able to provide.

It is the potential application of GPS technology to military uses which is responsible for the concern over GPS receiver accuracy. Specifically, precise positioning of targets can enable pinpoint accuracy in the delivery of highly destructive military payloads. Therefore, the possibility exists that our own satellite network could be used against the United States. For this reason, the GPS timing signals broadcast by the satellite network for commercial use are intentionally made less accurate than the encoded military signals. These timing and position errors are called Selective Availability (SA) and reduce the accuracy of civilian users to roughly 100 meters. While this inaccuracy is irrelevant on the high seas, coastal navigation or land-based applications such as search and rescue suffer, and potentially destroy the benefits of GPS technology.

To overcome the intentional errors introduced in the GPS timing signals, a system known as differential GPS (DGPS) was developed to reestablish accuracy for civilian users in a small, localized area such as coastal navigation. The system requires that a permanent GPS receiving and broadcasting station be established, and that the precise position of the station be determined. Using the fact that the errors introduced by a system of satellites will be the same errors transmitted to all receivers in a localized area, a mobile GPS receiver in range of the permanent station can determine its position and achieve the same degree of accuracy enjoyed by the military. This is accomplished by having the permanent station calculate the error introduced by the GPS satellites by comparing the signal received with the actual known position. This error factor can be transmitted to and used by all mobile receivers within the vicinity of the permanent station to determine their position accurately to within several meters instead of 100 meters. Of course, the accuracy of this DGPS determined position decreases the further away that a GPS receiver is from the permanent GPS receiving and broadcasting station.

Another form of differential GPS position determination has also substantially increased the usefulness of GPS receivers. As taught in Smith, U.S. Pat. No. 5,408,238, a comparison of absolute GPS determined locations can be used to determine the relative position or location of the GPS devices relative to each other. This comparison eliminates the need for a permanent base station which transmits an error correction factor because the absolute position of the GPS receivers is relevant only so far in that they are compared to each other to provide a relative position difference.

Returning now to our problem of locating a missing person, the exact longitude and latitude provided by DGPS is not often useful without very precise maps of sufficient resolution and of the area in question. Elevation may also play a very important factor if someone is lost in mountainous terrain. Therefore, it would be an advance over the prior art if a graphical interface could be provided for a differential or relative position GPS position detection system which would intuitively provide searchers a distance measurement and direction. It would also be an advantage if the graphical interface provided position information accurate to several meters using only GPS signals and positions determined by the systems GPS receivers, regardless of whether a permanent station is nearby providing GPS SA error compensation information. It would also be an advance over the prior art if the difference in elevation between the searchers and the lost person could be provided to that same degree of accuracy.

OBJECTS AND SUMMARY OF THE INVENTION

It is therefore an object of the present invention to provide a method and apparatus for locating the relative position of a first GPS receiver with respect to a second GPS receiver.

It is another object to provide a method and apparatus for graphically representing the relative position above, such that the information is displayed in an intuitive manner.

It is yet another object of the present invention to provide a method and apparatus for determining the difference in elevation between the GPS receivers.

It is still another object to provide a method and apparatus for providing the precise distance, direction and elevation to a GPS receiver that broadcasts a predetermined signal by selectively tuning the apparatus to the signal.

These and other objects not specifically recited are realized in a system of GPS devices which receive civilian GPS signals and provide an intuitive graphical interface for displaying the relative position of GPS devices in relation to each other, the relative position being accurate to several meters and defined as the distance to, direction of and height variance between GPS devices. A first GPS device with the person or object to be located transmits its GPS determined location to a second GPS device. This second GPS device includes a means for receiving the GPS determined position of the first GPS device, and also includes means for calculating the relative position of the first GPS device relative to the second GPS device based on a comparison of the received telemetry of the first GPS device and its own GPS determined position. The relative position of the first device is then graphically displayed on an interface of the second GPS device in a manner which eliminates the need for a map in order to travel to the location of the first GPS device. While providing an interface which displays a relative position of the first GPS device, this information remains accurate no matter how the orientation of the second GPS device changes with respect to a compass.

The system would further include the ability of the second GPS device to tune to a signal broadcast by different GPS transceiver devices. By selectively tuning to the signal of a desired GPS device, a distance of, direction to and elevation variance of a plurality of different GPS devices is possible.

Also disclosed is a method for determining the distance, direction and elevation to a GPS device, and includes the steps of (i) determining a location of a first GPS device including a Selective Availability (SA) induced longitude and latitude error, (ii) determining a location of a second GPS including the approximately same SA induced longitude and latitude error, (iii) transmitting the location of the first GPS device to the second GPS device, (iv) enabling the second GPS device to receive the first GPS device's telemetry signal including the location of the first GPS device, (v) comparing the telemetry of the first GPS device to that of the second GPS device, and using the comparison of absolute longitudes and latitudes to determine a relative distance to, direction of and elevation variance between said GPS devices, and (vi) displaying the relative position of the first GPS device on an interface of the second GPS device in a graphical manner so as to intuitively provide the relative location of, the distance to and the elevation variance of the first GPS device relative to the second GPS device.

DESCRIPTION OF THE DRAWINGS

FIG. 5A is the preferred embodiment of an interface providing a graphical display for the relative position determining GPS device system illustrated in FIG. 4.

FIG. 5B is a variation of the preferred embodiment shown in FIG. 5A.

FIG. 5C shows how the arrow of a graphical display remains stationary relative to a fixed reference point (a compass) when the GPS device is rotated relative to the compass.

FIG. 5D illustrates a modification to the preferred graphical display embodiment of FIG. 5A.

FIG. 6 is an alternative embodiment of an interface providing a graphical display for the system of GPS devices illustrated in FIG. 4.

DETAILED DESCRIPTION OF THE INVENTION

Figure 1:
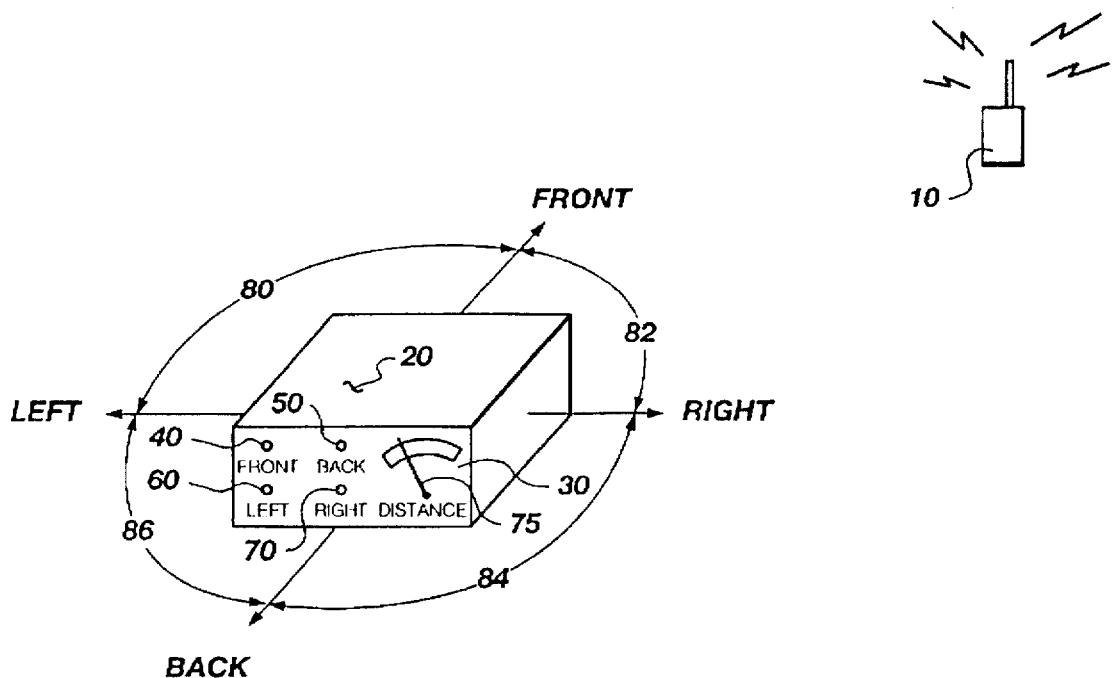
FIG. 1 is an illustration of the components in a UHF tracking device with the associated position tracking display of the prior art.

FIG. 1 illustrates the components and a typical display of a UHF tracking system. As shown, a transmitter 10 is at some unknown location some distance from the tracking device 20. The tracking device is typically mounted inside a vehicle, such as a police car. When the transmitter 10 is activated, the tracking device "homes in" on the transmitter. This is accomplished by a display 30 indicating whether the transmitter 10 is in front 40 or in back 50, to the left 60 or the right 70 of the tracking device 20. A distance indicator 75 also shows a relative distance to the transmitter 10 by indicating the strength of the signal received.

Such a system only provides vague references to the location of the transmitter 10 at best. For example, the direction of the transmitter 10 can only be known to within 90 degrees. This is because the front\back and left\right indicators 40, 50, 60 and 70 only define four quadrants, 80, 82, 84 and 86 in which the transmitter 10 can be found. In addition, because the distance indicator 75 relies only on a measure of the signal strength received, distortion or interference with the transmitted signal can give a false indication of actual distance to the transmitter 10. There is also no way to know whether there is interference until a UHF transmitter 10 is tracked down. Furthermore, the UHF signal tracker 20 cannot indicate a height variance between the transmitter 10 and the tracking device 20. A tracker using a UHF signal tracker 20 mounted in a car might arrive at a mountain and still show substantial distance to the transmitter 10, and yet the distance might be vertical and impassable. Forewarning of great altitude variations is helpful in planning the method and supplies required for tracking.

Figure 2A:
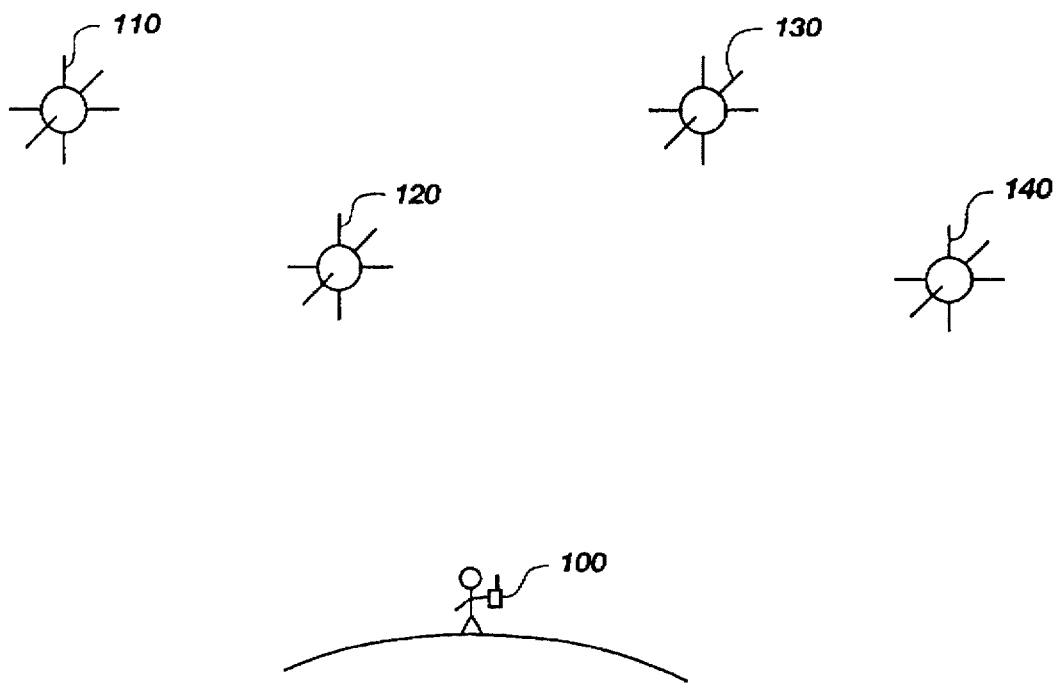
FIG. 2A is a perspective view of the components of a Global Positioning System (GPS).

FIG. 2A illustrates the original concept of the Global Positioning System (GPS). A GPS receiver 100 receives timing signals from at least three, and preferably four low earth orbiting satellites 110, 120, 130 and 140. The timing signals are provided by extremely accurate atomic clocks in the satellites, two redundant clocks aboard each satellite providing backup. Three satellites provide sufficient information for a GPS receiver 100 to calculate a longitude and latitude using triangulation formulas well known to those skilled in the art. If a signal can be received from four satellites, the altitude of the GPS receiver 100 can also be determined using a modified formula.

Figure 2B:
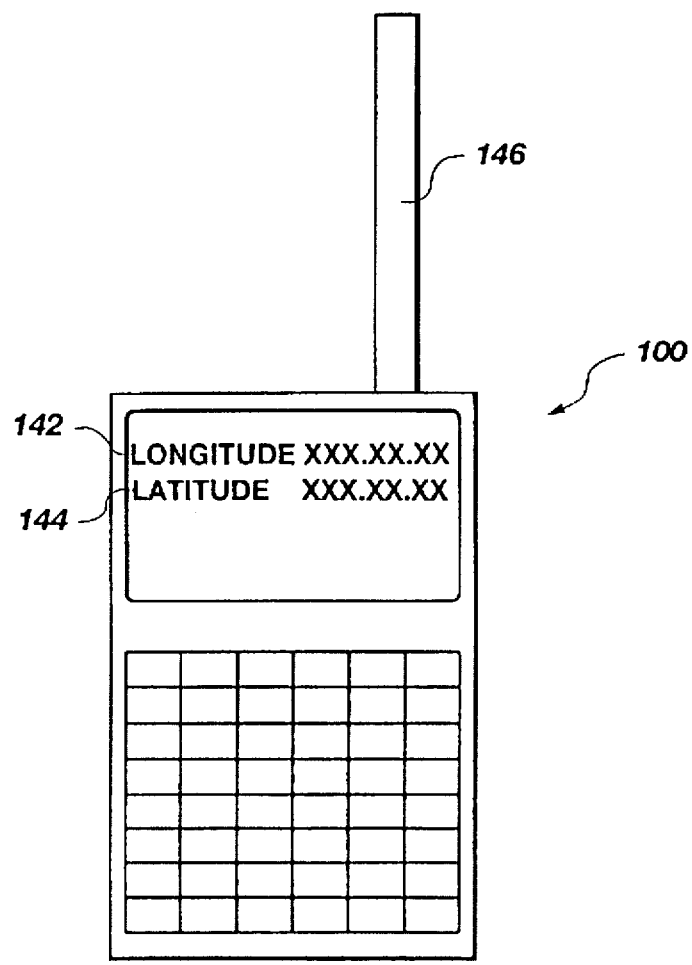
FIG. 2B is an illustration of a GPS receiver and its associated display as found in the prior art.

FIG. 2B illustrates a typical display of a GPS device 100 as found in the prior art which provides location information to the user in longitude 142 and latitude 144 coordinates. This is because the GPS was originally intended for use as an absolute location determining device and had only an antenna 146 for receiving GPS signals. In this configuration, the only useful information the GPS device can provide is coordinates which can be used to find a location on a map.

Figure 3:
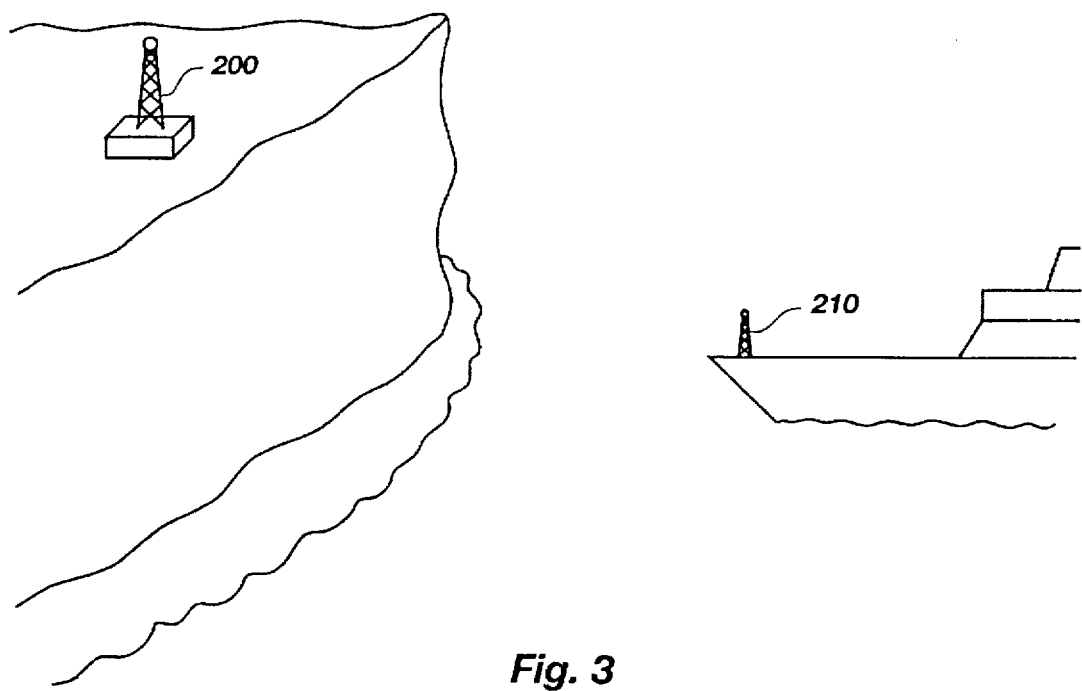
FIG. 3 is a perspective view of the components of a Differential GPS (DGPS) system which provides absolute longitude and latitude while eliminating the Selective Availability induced error.

FIG. 3 illustrates the differential GPS (DGPS) concept that was made necessary by the military's introduction of an error into the GPS signals broadcast by the GPS satellites. For coastal navigation, a series of permanent GPS stations 200 such as the one shown broadcast an error correction code which enables mobile GPS receivers 210 in the vicinity of the permanent GPS station 200 to determine their location to the same level of accuracy enjoyed by military systems. The Selective Availability (SA) error is corrected by using the previously determined accurate location of the permanent station 200, receiving the GPS signals to calculate a location, determining the error between the broadcast position and the known position, and then broadcasting the error correction factor to mobile GPS receivers. GPS receivers 210 then correct their own GPS calculated position using the broadcast correction factor. The error correction factor is thus only accurate for GPS receivers near the permanent station.

While the DGPS system does restore accuracy to the GPS location calculations, the system is only useful for search and rescue or location determination if very detailed maps are available.

Figure 4:
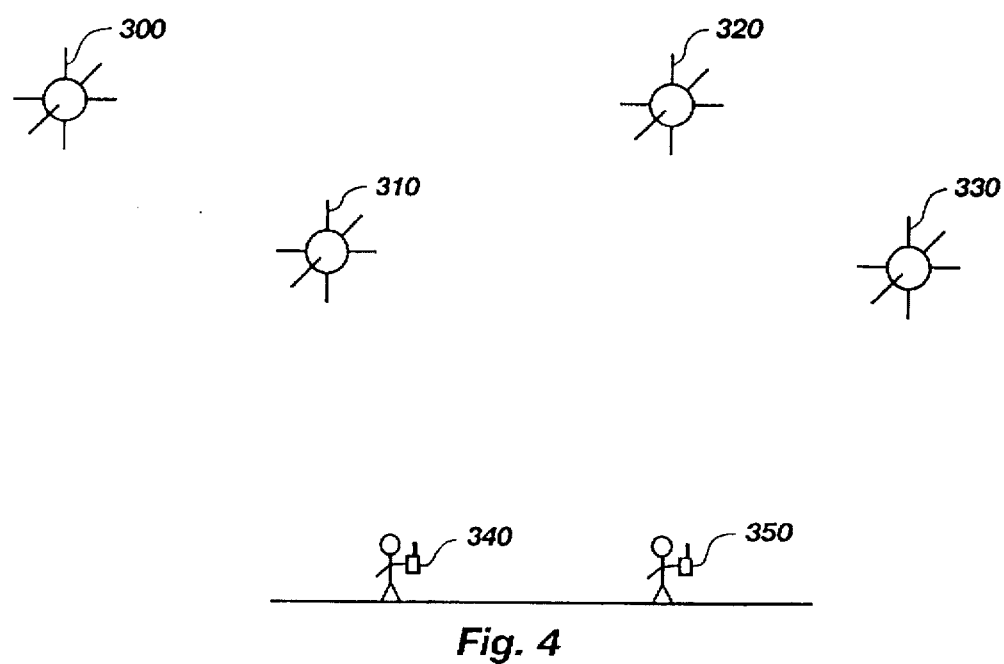
FIG. 4 is a perspective view of the components in a relative GPS system made in accordance with the principles of the present invention.

FIG. 4 illustrates the preferred embodiment of the present invention which overcomes the need for detailed maps when locating a GPS receiver made in accordance with the principles of the present invention. The same number of satellites are necessary as in the normal GPS position determining system of FIG. 1. Three satellites 300, 310 and 320 provide sufficient information to determine a position, and a fourth satellite 330 can provide altitude information. What should also be explained before discussing the operation of the GPS devices of the present invention is that while the term "receiver" is accurate or GPS device of the prior art, the GPS devices of the present invention can be receivers or transceivers, depending upon the particular application of the present invention. Therefore, the specification will now refer to GPS devices which implies that they can be either receivers or transceivers. A last convention to note is that the "first GPS device" is always assumed to be the GPS device being tracked, and the "second GPS device" will always be assumed to be the GPS device which is receiving telemetry so as to track the first GPS device, unless otherwise noted.

As stated previously, the differential or relative location determining method used in the present invention is different from that described in FIG. 3. This method eliminates the need for permanent GPS stations which provide error correction, because the location of the GPS device defined by the actual longitude and latitude is relevant only insofar as they are used to calculate the distance between a first or tracked GPS device and a second or tracking GPS device. The only limitation is that the induced SA error be nearly the same for both receivers to achieve a distance calculation accurate to less than 100 meters. This requirement is easily satisfied because the induced SA position error will be nearly the same for GPS devices within one hundred miles of each other and therefore substantially insignificant. In addition, as the GPS receivers get closer, the error becomes negligible. What should be obvious, therefore, is that distance is always accurate to at lease 100 meters.

The first and second GPS devices are capable of determining their location in terms of longitude and latitude according to the methods well known to those skilled in the art through triangulation (location) and quadrangulation (location and elevation) formulas. The innovation of the present invention begins with the first GPS device 340 being modified to be a transceiver so as to transmit this location or location and elevation as telemetry data. Another point of novelty is that the second GPS device 350 is modified not only to receive GPS signals, but also to receive this telemetry data from the first GPS receiver.

A further modification is that the second GPS device 350 is advantageously and selectively tuneable to receive telemetry from a desired frequency. This enables the second GPS device 350 to be be able to track multiple GPS devices. It is also possible to provide a tuner such that a plurality of GPS devices can be simultaneously tracked and displayed on the second GPS device 350 interface. These features also imply that the first GPS device 340 can advantageously selectively transmit telemetry on a desired frequency.

After receiving the telemetry transmission of the first GPS device 340, device 350 calculates a relative distance between the GPS receivers 340 and 350 by comparing absolute longitudes and latitudes. The interface of the second GPS device 350 then graphically displays the position of the first GPS device 340 relative to the second GPS device 350 in an intuitive manner which facilitates immediate travel to the first GPS device 340 without consulting a map. Specifically, the interface 352 of the second GPS receiver is shown in FIG. 5A and is comprised of an LCD screen 352.

such as the type used in portable notebook computers but smaller. The interface 352 consists of an arrow 354, an end 356 of the arrow 354 generally fixed on the display 352 and an opposite pointing end 358 of the arrow 354 which continuously points in the direction of the first GPS device 340. This is accomplished by pivoting or rotating the arrow 354 about the fixed end 356. The circle 360 defines the limit of travel of the arrow 354 on the interface 352 and does not need to be shown. However, if left on the display, the circle 360 can be conveniently divided by tick marks 362, as shown in close-up view FIG. 5B. The tick marks 362 represent the 360 degrees of a compass.

Returing now to the system of GPS devices, the second GPS device 350 is constantly receiving updated telemetry data from the first GPS device 340 and from the GPS satellites 300, 310, 320, 330 overhead. This allows the second GPS device 350 to continuously update the direction in which the arrow 354 is pointing. This ability is crucial because the orientation of the second GPS device 350 relative to a compass may be changing constantly. Therefore, the present invention envisions that a user will be able to hold the second GPS device 350 and turn in a circle, and the arrow 354 will always point toward the first GPS device 340. This implies that the circle 360, if shown, also remains fixed relative to the compass. This ability is a result of an internal compass of the second GPS device 350. The internal compass provides a fixed reference point relative to which the continuously displayed arrow 354 will use to always point toward the first GPS device 340.

The feature described above is illustrated, for example, in FIG. 5C. For this drawing, the direction north of the fixed compass 368 is toward the top of the paper. The direction "north" might be true north or magnetic north. The two GPS devices illustrated are the same GPS device 366, but shown in two different positions or orientations relative to the fixed compass 368. What remains constant (as long as the object being tracked does not move) is that the arrow 354 always points due east to some tracked GPS device whose telemetry data has been received by the pictured GPS device 366. Not shown because of the scale of the drawing is the fact that the arrow 354 also points to the same tick mark 362 at approximately 90 degrees, the circle 360 and tick marks 362 also remain fixed relative to the compass 368.

With respect to the intuitive nature of this preferred embodiment shown in FIG. 5A, it should be noted that while the direction to travel is displayed graphically on this particular display, distance is not. Distance, as well as other useful but presently nongraphically displayed information is displayed as text in an unused portion of the LCD screen 352. This information includes but is not limited to the selected telemetry frequency or frequencies of remote first GPS devices 340. It is also possible to choose a units of distance for the displayed distance measurement shown as text so as to conform to user preferences for the U.S. or metric system.

Figure 10:
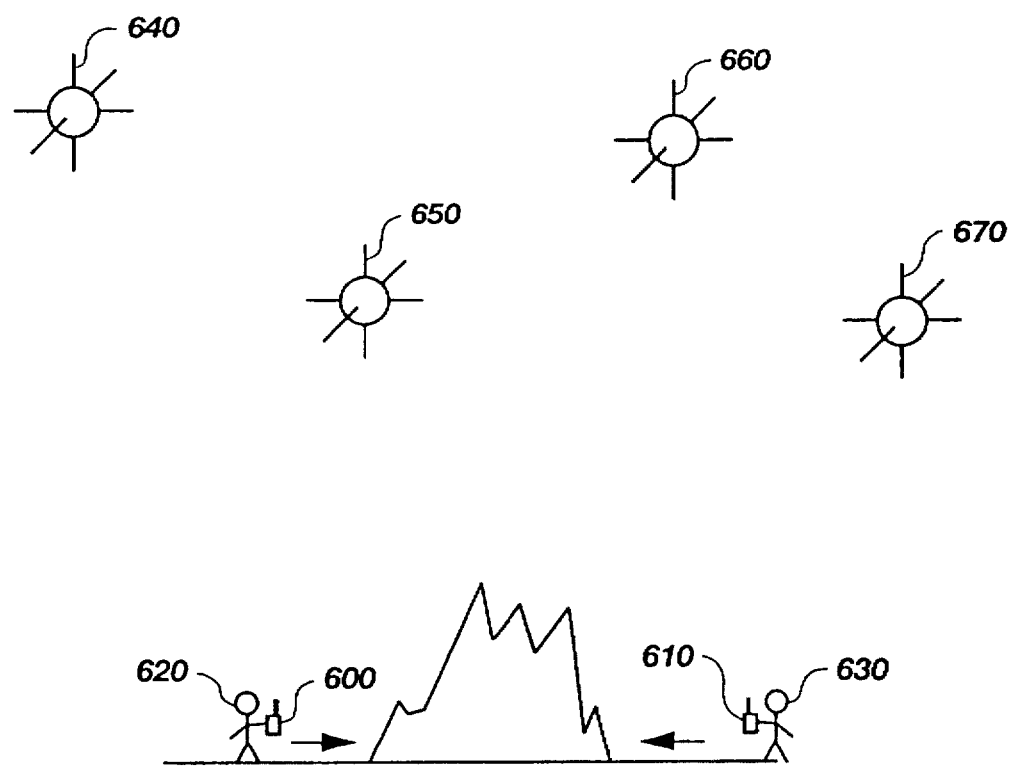
FIG. 10 is a perspective view of another embodiment of the present invention.

While the preferred embodiment has discussed a first GPS device 350 which does not receive but only transmits telemetry data, and a second GPS device 350 which does the reverse, it should be obvious that the second GPS device 350 can be modified to transmit as well as to receive telemetry data, and that more than one of these modified second GPS 350 type devices can be used. This enables the users of a system of two second GPS type devices 350 to simultaneously move toward each other as depicted in FIG. 10.

A variation of the arrow 354 with an end 356 fixed at a center of a circle 360 representing the location of the second GPS device 350 is an arrow 370 as shown in figure 5D. Instead of being anchored at an end point 356, this arrow 370 rotates about a midpoint of the arrow 370. The advantage of this design is that it provides a larger arrow 370 within the relatively small LCD display screen 352 of the second GPS device 350.

FIG. 6 illustrates an alternative embodiment of the graphical screen display of FIGS. 5A and 5D. The displayed information can be modified to present different and advantageously more useful and intuitive information to the user, at a cost to the user of more circuitry and sophistication of the GPS devices. More intuitively useful information is displayed on the interface 352 by replacing the direction arrows 354 or 370 with a grid. Centered on the location of the user or second GPS device 350, represented by some type of mark 372, are a plurality of increasingly larger concentric circles 374. The circles 374 are scaled so as to represent uniformly spaced distances. Finally, some type of mark 378 such as a small circle, square or other designation which is easily visible on the screen represents the first GPS device 340 which is being tracked.

The significant advantage of this display is that not only does it show the direction to travel, but at a single glance gives the user some easily discernible and graphical representation of the distance to the first GPS device 340. A scale also appears on the display so that the user is able to quickly calculate the distance based on the uniform distance between each concentric circle. This is done by counting the number of circles from the center 372 out to the relative position 378 of the first GPS device 340, then multiplying this number by the scale of the distance between circles. For example, if the scale of 5 miles between circles 374, the distance to the first GPS device is approximately 27.5 miles.

This particular embodiment also employs the use of an algorithm to automatically adjust the scale of the interface 352 to make the displayed information more helpful. For example, the scale of distance between concentric circles 374 becomes less useful when the distance between circles is relatively large compared to the distance of the object being tracked. An algorithm can compensate for changes in distance by recognizing when the displayed scale is no longer appropriate.

For example, suppose the scale is 5 miles between concentric circles, and yet the object being tracked 378 is only 1000 feet away from the second GPS device 350 shown as marker 372. On the relatively small LCD interface 352 of the second GPS device 350, the location of the first GPS device 340 might appear to be at the center of the concentric circle 374, prectically overlapping the marker 372 of the first GPS device. By scaling the circles 374 to represent for example 300 feet between them, the mark 378 designating the location of the first GPS device 340 would appear at a comfortable distance from the center of the concentric circles 374. This makes both the distance and the direction of travel much easier for the user to see.

Of significant novelty to the present invention is also the ability to calculate and display an elevation variance. Unlike many GPS systems of the prior art which are limited to sea-based applications where elevation is substantially irrelevant, the present invention is also capable of providing a graphical representation of an elevation variance if line-of-sight was established between the first and second GPS devices and a fourth satellite 330 (FIG. 4).

Intuitive display of the elevation variance might be useful to the user of the second GPS device when the scale of distance and elevation variance are not too different.

Figure 7A:
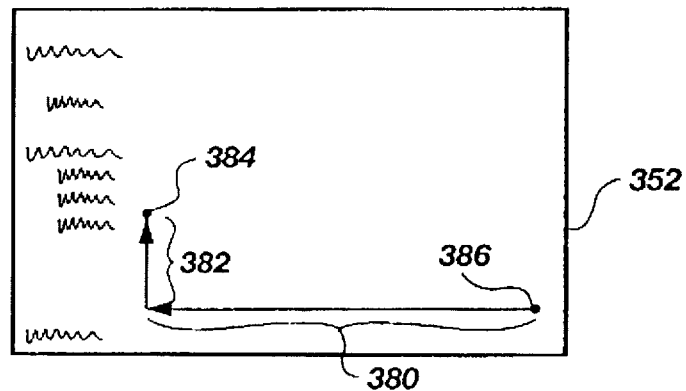
FIG. 7A is an alternative embodiment of an interface providing a graphical display of variance in elevation for the system of GPS devices illustrated in FIG. 4.
Figure 7B:
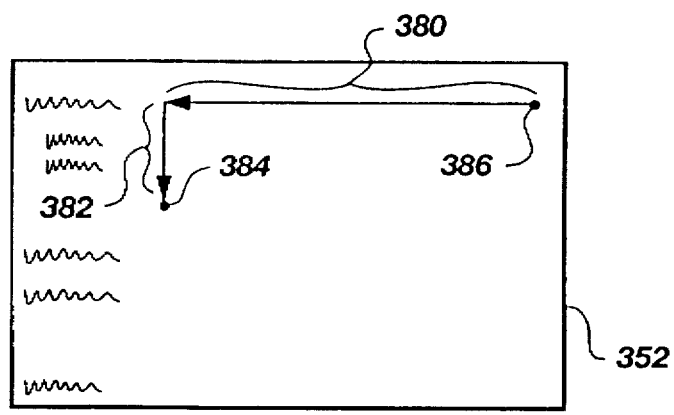
FIG. 7B is a variation of the embodiment of FIG. 7A.

Therefore, graphical display of elevation relative to distance is provided by toggling between a screen providing graphical direction information (FIG. 5A) or graphical direction and distance information (FIG. 6) to a screen as shown in FIGS. 7A or 7B. This screen 352 displays the horizontal distance to travel 380 on the horizontal axis 380, and an elevation variance 382 when on a meaningful scale. In contrast, if the distance to travel horizontally is in miles and the height variance is less than 100 feet, the scale of the displayable graph is probably not useful, and the elevation variance might be consigned to a text display only. The decision making process to determine if useful information can be derived from such a display as shown in FIGS. 7A and 7B is made part of an algorithm within the second GPS 350. However, the parameters of what is to be considered useful distance versus elevation data are also user modifiable so as to customize the second GPS device 350 to the preferences of the user. The FIGS. 7A and 7B also show that the display illustrates whether the object being tracked 384 is above or below the person doing the tracting 386. For example, FIG. 7A shows the interface 352 if the first GPS device 340 is above the second GPS device 350, and FIG. 7B shows the interface 352 when positions are reversed.

Figure 8:
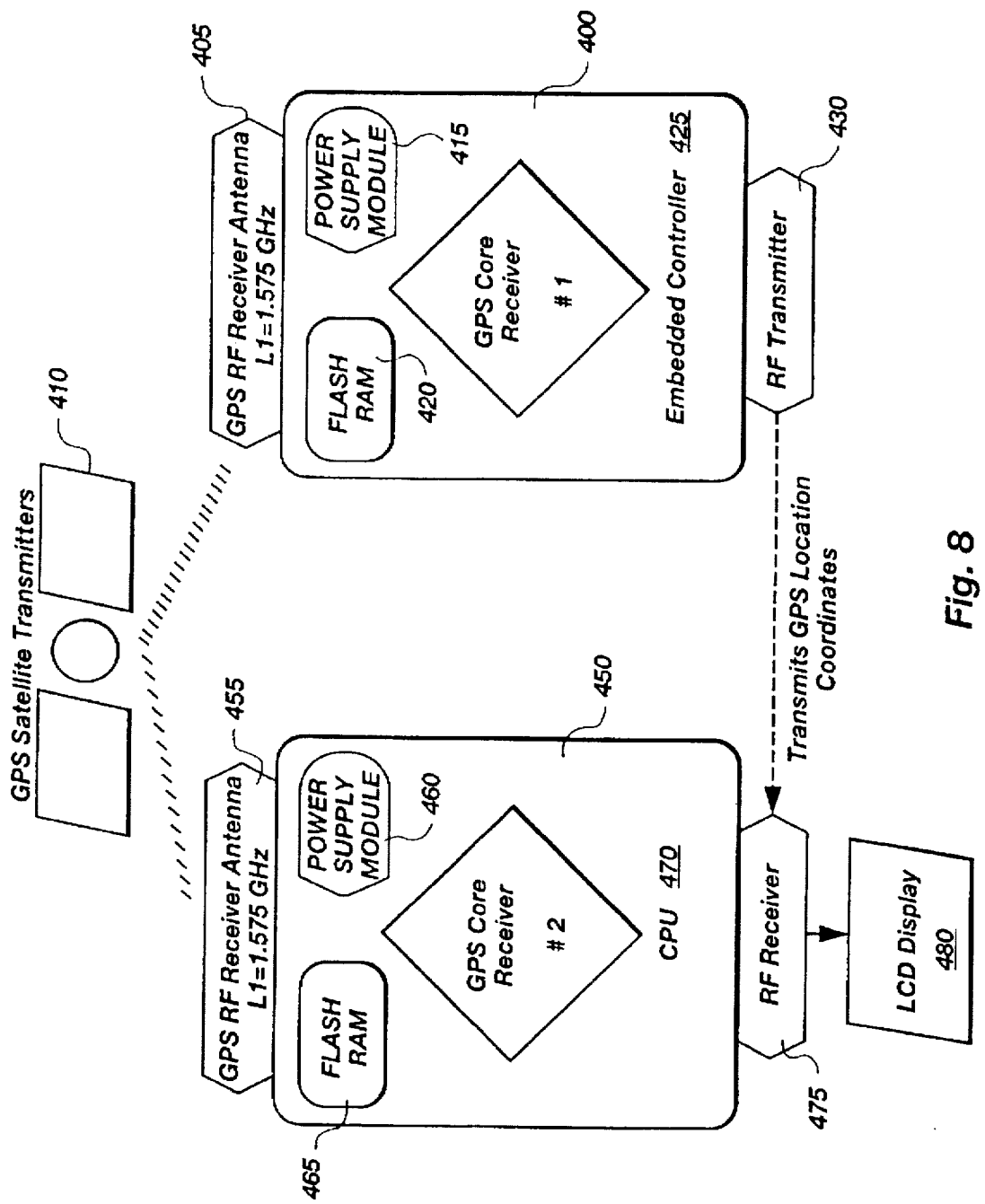
FIG. 8 is a block diagram of the components of the relative GPS system used in FIG. 4.

FIG. 8 illustrates in block diagram form the basic components which are used in a preferred embodiment of the GPS devices 340, 350 receivers of the present invention. A first GPS device 400 comprises an RF receiving antenna 405 tuned to the GPS satellite broadcasting frequency of 1.575 GHz for receiving clock signals from the GPS Satellite transmitters 410 in orbit. The first GPS device 400 contains a power supply module 415 and flash RAM 420 for storing computations. The GPS triangulation or quadrangulation calculations are made by an internal embedded controller 425 or microprocessor which uses GPS signals to calculate its location in terms of longitude and latitude. This location is transmitted by means of an RF transmitter 430 to a second GPS device 450. This second GPS device 450 is similar to the first GPS device 400 in that the second device 450 also receives GPS satellite signals through an antenna 455, and contains a power supply 460 and flash RAM 465. However, the second GPS device 450 has a CPU 470 capable of handling more diverse tasks than the embedded controller 425 of the first GPS device 400. In addition, the second device 450 has an RF receiver 475 for receiving the transmitted location of the first GPS device 400. Finally, the second GPS device 450 advantageously has an LCD interface 480 for indicating to the user the relative position of device 400 relative to the second GPS device 450. A variation on this preferred embodiment would be an LCD interface on the first GPS device 400.

Figure 9:
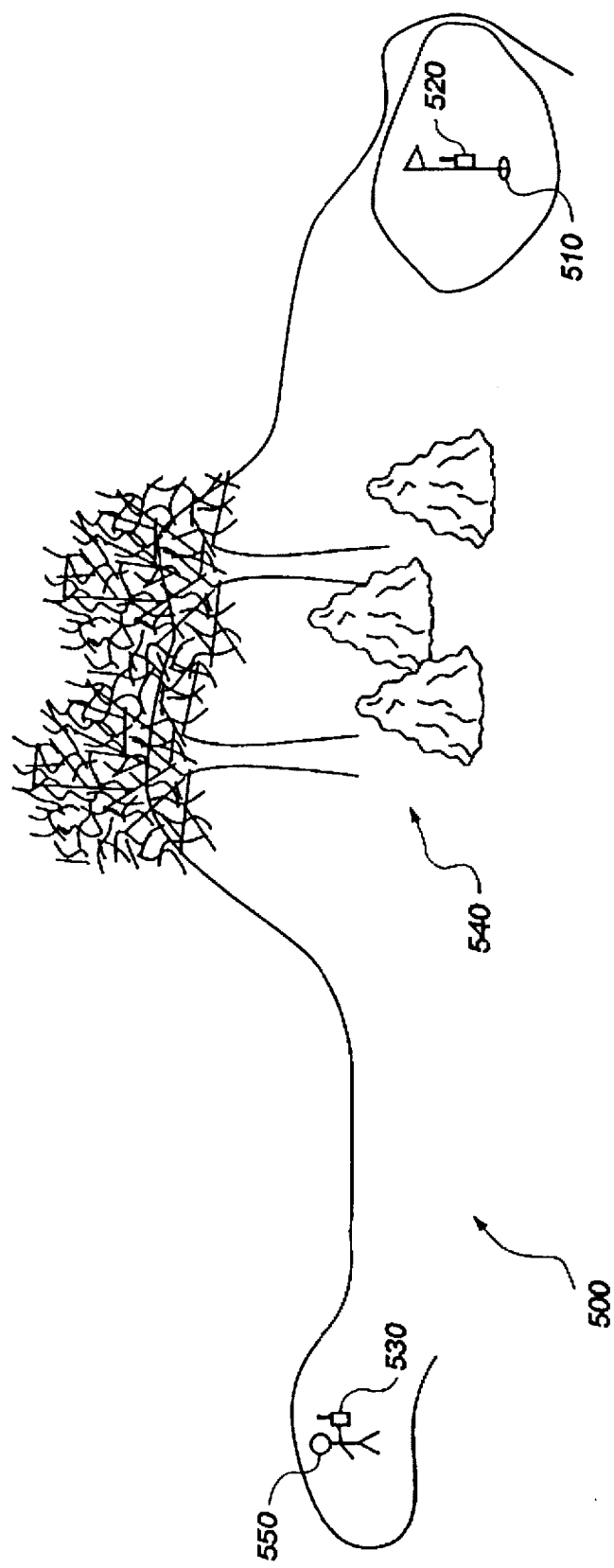
FIG. 9 is a perspective view of another embodiment of the present invention.

Variations on the preferred embodiment are possible depending upon the particular application of the present invention. A particular example of an application for which the present invention is particularly suited is for a golf course. A golf hole is illustrated in FIG. 9. Each golf hole 510 of the course 500 would be equipped with a GPS device 520 capable of transmitting a GPS determined position. A golfer would tune a GPS device 530 to receive telemetry on a predetermined frequency assigned to a particular hole on which the golfer is playing. If the golf hole 510 is obscured by a hill or foliage 540, the golfer 550 will always know the precise distance and direction to aim, and consequently will be better able to choose a club. When a golf hole is completed, the golfer tunes a GPS device to the frequency for receiving telemetry data for the next golf hole. Advantageously, the present invention works at any golf course, for any golf hole, and anywhere on the course because there is no displayed map with boundaries. Furthermore, not only would selective tuning to receive different GPS signals be possible, but GPS receivers could also selectively transmit on desired frequencies.

Another embodiment of the present invention would be GPS devices 600 and 610 capable of both transmitting their GPS determined position and receiving the GPS position of the other GPS device as illustrated in FIG. 10. As before, the GPS satellites 640, 650, 660, and 670 would enable the GPS devices 600 and 610 to determine their position on or above the earth, as well as their elevation variance. The advantage of this embodiment would be to enable both parties 620 and 630 carrying GPS relative position devices 600 and 610 to move towards each other simultaneously.

It is to be understood that the described embodiments of the invention are illustrative only, and that modifications thereof may occur to those skilled in the art. Accordingly, this invention is not to be regarded as limited to the embodiments disclosed, but is to be limited only as defined by the appended claims herein.

What is claimed is:

1. A device for displaying a position of an object relative to the device and being responsive to data communicated from the orbiting Global Positioning System (GPS) satellite network, said device comprising:

means for receiving and processing GPS signals from the orbiting GPS satellites, means for determining a geographical location of the device from the GPS signals, and for correlating the geographical location of the device to be coincident with a point of origin on a visual display means, means for receiving and processing telemetry data containing a geographical location of the object, means for calculating the position of the object relative to the device so as to provide an approximate direction of travel and distance to the object from the device, and the visual display means for graphically displaying the relative position of the object with respect to 1) any physical orientation of the graphical display means of the device which is in a generally horizontal plane relative to the earth, and 2) the point of origin on the visual display means, and wherein the relative position of the object is displayed utilizing at least a direction indicating symbol to portray the relative position information.

2. The relative position indicating system of claim 1 wherein the calculating means for determining the relative position of the at least one of the plurality of GPS devices relative to the at least another one of the GPS devices further comprises a means for determining a relative height variance of the at least one of the plurality of GPS devices relative to the at least another one of the plurality of GPS devices.

3. The relative position indicating system of claim 2 wherein the graphical display means comprises at least one interface which graphically indicates the direction of travel to the at least one of the plurality of GPS devices.

4. The relative position indicating system of claim 3 wherein the graphical display means comprises an interface displaying an arrow with a fixed end and an opposite pointing end, the arrow rotating about the fixed end so that the opposite pointing end is free to indicate the direction of travel to the at least one of the plurality of GPS devices.

5. The relative position indicating system of claim 3 wherein the graphical display means comprises an interface displaying an arrow which rotates generally around a midpoint so as to indicate the direction of travel to the at least one of the plurality of GPS devices.

6. The relative position indicating system of claim 3 wherein the graphical display means comprises an interface displaying a grid including a plurality of generally uniformly spaced concentric circles, the distance between circles representing a selectable scaled distance chosen so as to provide a graphical indication of distance, the circles being centered about a first marker representing the location of the at least another one of the plurality of GPS devices, and a second marker representing the location of the at least one of the plurality of GPS devices relative to the at least another one of the plurality of GPS devices.

7. The relative position indicating system of claim 3 wherein the graphical display means comprises a plurality of interfaces which graphically indicate the direction of travel to the at least one of the plurality of GPS devices.

8. The relative position indicating system of claim 7 wherein the plurality of GPS devices can selectively toggle between the plurality of interfaces which graphically indicate the direction of travel to the at least one of the plurality of GPS devices.

9. The relative position indicating system of claim 8 wherein the transmitter means of the at least one of the plurality of GPS devices further comprises means for selectively tuning said transmitter means to broadcast on a desired frequency.

10. The relative position indicating system of claim 9 wherein the at least another one of the plurality of GPS devices further comprises means for selectively tuning said receiving means to receive a desired telemetry frequency.

11. The relative position indicating system of claim 10 wherein the calculating means of the least another one of the plurality of GPS devices compares the location transmitted as the telemetry of the at least one of the plurality of GPS devices to the location determined by the at least another one of the plurality of GPS device so as to determine the direction of travel and distance to the at least one of the plurality of GPS devices.

12. The relative position indicating system of claim 11 wherein calculated locations of the plurality of GPS devices further comprise a longitude and latitude for each of said GPS devices, with approximately a same intentional Selective Availability induced error in the locations.

13. The relative position indicating system of claim 12 wherein the at least another one of the plurality of GPS devices further comprises a means for determining whether distance information plotted relative to elevation variance of the at least one of the plurality of GPS devices relative to the at least another one of the plurality of GPS devices will be meaningful when displayed graphically.

* * * * *